(12) United States Patent
Hammond

(10) Patent No.: US 8,835,763 B1
(45) Date of Patent: Sep. 16, 2014

(54) SHIELD FOR PROTECTING ELECTRICAL BOXES

(76) Inventor: Garry Paul Hammond, Martinsville, IN (US)

(*) Notice: Subject to any disclaimer, the term of this patent is extended or adjusted under 35 U.S.C. 154(b) by 61 days.

(21) Appl. No.: 13/608,417

(22) Filed: Sep. 10, 2012

Related U.S. Application Data

(60) Provisional application No. 61/542,326, filed on Oct. 3, 2011.

(51) Int. Cl.
*H05K 5/03* (2006.01)

(52) U.S. Cl.
USPC .................. 174/66; 174/67; 220/241; 33/528

(58) Field of Classification Search
USPC .................. 174/66, 67; 220/241, 242; 33/528
See application file for complete search history.

(56) References Cited

U.S. PATENT DOCUMENTS

| | | | |
|---|---|---|---|
| 3,745,664 A * | 7/1973 | Altseimer | 33/528 |
| 5,003,128 A | 3/1991 | Grondin | |
| 5,285,014 A | 2/1994 | Gilchrist | |
| D425,768 S | 5/2000 | Staley | |
| 6,576,837 B1 * | 6/2003 | Pimentel | 174/58 |
| 6,803,522 B2 | 10/2004 | Skakun | |
| 6,927,341 B1 | 8/2005 | Crane | |
| 7,071,413 B1 | 7/2006 | Paape | |
| 7,456,359 B1 | 11/2008 | Tidd | |
| D583,205 S | 12/2008 | Waliszewski | |
| 7,622,675 B2 | 11/2009 | Sutter | |
| D644,895 S | 9/2011 | Erdfarb | |

* cited by examiner

*Primary Examiner* — Dhirubhai R Patel
(74) *Attorney, Agent, or Firm* — Krieg DeVault LLP

(57) ABSTRACT

A paint shield for protecting and covering an electrical junction box typically mounted in a wall of a structure is disclosed. Junction boxes used for outlets and switches typically include an inner surface defined by side walls meeting top and bottom walls at corners of the box. The paint shield engages the junction box only at the corners so allow easy insertion and removal of the paint shield. The paint shield can also be configured to enclose a light switch or outlet protruding from the junction box and beyond the plane of the wall surface.

20 Claims, 4 Drawing Sheets

SHIELD FOR PROTECTING ELECTRICAL BOXES

CROSS-REFERENCE TO RELATED APPLICATION

The present application claims the benefit of the filing date of provisional application No. 61/542,326 filed on Oct. 3, 2011, which is incorporated herein by reference.

FIELD OF THE INVENTION

The present invention relates to devices used to protect and shield electrical boxes during painting and other surface finishing treatments.

BACKGROUND

Walls and other surfaces typically include one or more electrical devices, such as switches and outlets, that are mounted in a junction box which is fastened to the studs of a wall or other surface. The interior of the junction box is exposed by a hole in the wall, and a cover plate is used to enclose the switch or outlet and the opening into the junction box. The cover plate provides a finished appearance while providing access to the device, such as a lever for operating the switch or sockets for receiving a plug. The cover plate normally overlies a portion of the wall which needs to be painted or otherwise finished, and is typically removed by painters prior to painting or finishing a surface. However, this leaves the electrical device exposed to damage or defacement caused by poorly aimed brush or roller strokes, paint spray, plastering or spackling.

It is well known to apply a temporary paint shield to the electrical device to protect it from misdirected paint and the like. However, prior art paint shields suffer generally from a lack of stability when mounted to the junction box. Therefore, the devices can be easily bumped or knocked from position, exposing the electrical device for potential damage or requiring the painter to attend to the shield during painting, neither of which is desirable. In addition, some paint shields fit poorly in the junction box and therefore cannot be positioned against the wall around the junction box, allowing runs, drips, splashes and poorly aimed strokes to penetrate behind the shield and reach the electrical device. Therefore, improvements in this technological area are needed.

SUMMARY

A paint shield for temporary mounting on an electrical device during painting or other wall finishing operations is provided. The paint shield can be used on a variety of electrical devices, including standard wall type switches and electrical outlets. The paint shield includes a an outer wall member that overlies the electrical device and a plurality of mounting members extending from corners of the outer wall member that frictionally engage the paint shield to the junction box of the electrical device. The mounting members releasably engage inner surfaces of the junction device at each of the corners of the junction device to engage and provide a stable mounting relationship between the paint shield and the junction device, preventing the paint shield from being easily dislodged from the electrical device. The outer wall member can be configured to accommodate one or more levers of a switch type electrical device or one or more sockets of an outlet type electrical device.

The paint shield has an outer wall member having a front, a rear, and a perimeter. One or more mounting members are connected to a planar rear facing surface portion of the wall member and extend outwardly and rearwardly from the rear surface thereof. The wall member defines a planar lip that extends around and circumscribes the mounting members so that the lip is positioned against the wall surface in which the electrical device is mounted when the mounting members are secured in the junction box.

The mounting members are located near each of the corners of the outer wall member of the shield. The mounting members can have various forms. In one embodiment, the mounting members each include an elongated, tapered configuration extending from the rear surface. The mounting members taper in cross-section to the outer end thereof to facilitate initial deflection of the mounting members and placement of the mounting members into the opening of the junction box. As the shield is further advanced into the opening of the junction box, the increasing cross-section of the mounting members increases the mounting member stiffness and its frictional hold on the inner walls of the junction box until the planar, rearwardly facing perimeter lip of the paint shield is positioned flush with the wall in which the electrical device is mounted.

Also contemplated is a combination paint shield and junction box in which the paint shield includes a wall member for covering the outer opening of the junction box and any structures, such as switches and outlets, mounted to the junction box, and a plurality of mounting members extending rearwardly from at least two corners of the wall member that frictionally engage inner surfaces of the junction box at respective ones of the corners of the junction box.

Also contemplated is a method of shielding an electrical device during painting. The method includes placing a paint shield so that a wall member of the paint shield covers the wall opening defined by the junction box with mounting members extending rearwardly from the wall member engaging inner corners of the junction box. In one embodiment, the method includes inwardly deflecting the mounting members toward one another as the paint shield is placed on the junction box to frictionally engage the mounting members with inner wall surfaces of the junction box that define the corners.

Further, additional embodiments, features, forms, objects and advantages are realized through the methods and devices disclosed herein. These and other embodiments and aspects are described in further detail herein below.

DESCRIPTION OF ILLUSTRATED EMBODIMENTS

Figure 1:
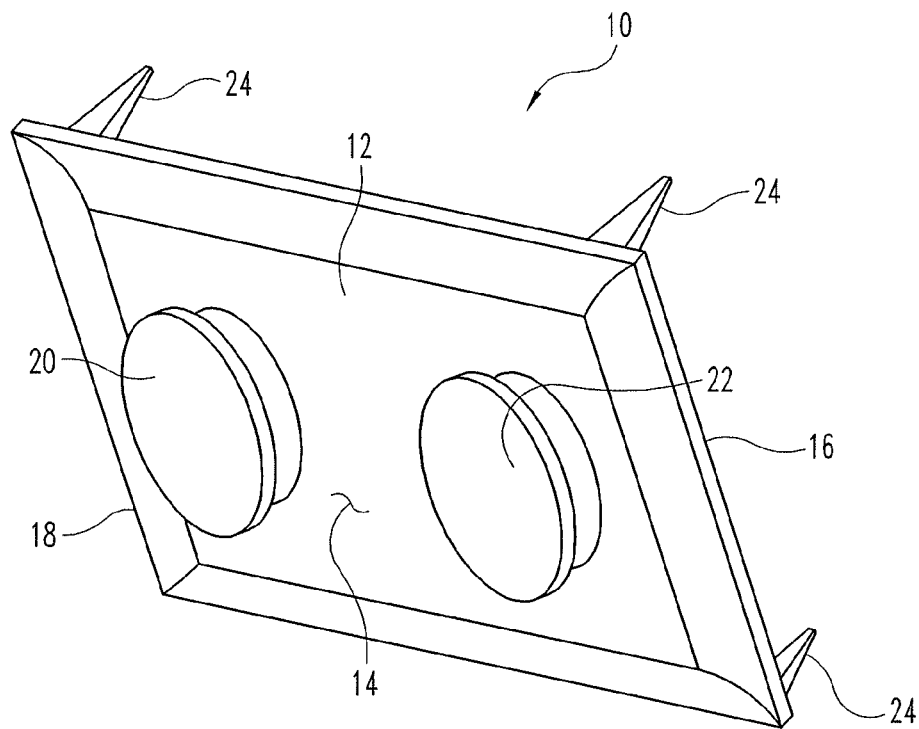
FIG. 1 is a perspective view of one embodiment paint shield.

For the purposes of promoting an understanding of the principles of the invention, reference will now be made to the embodiments illustrated in the drawings and specific language will be used to describe the same. It will nevertheless be understood that no limitation of the scope of the invention is hereby intended, and that alterations and further modifications to the illustrated devices and/or further applications of the principles of the invention as illustrated herein are contemplated as would normally occur to one skilled in the art to which the invention relates.

Figure 2:
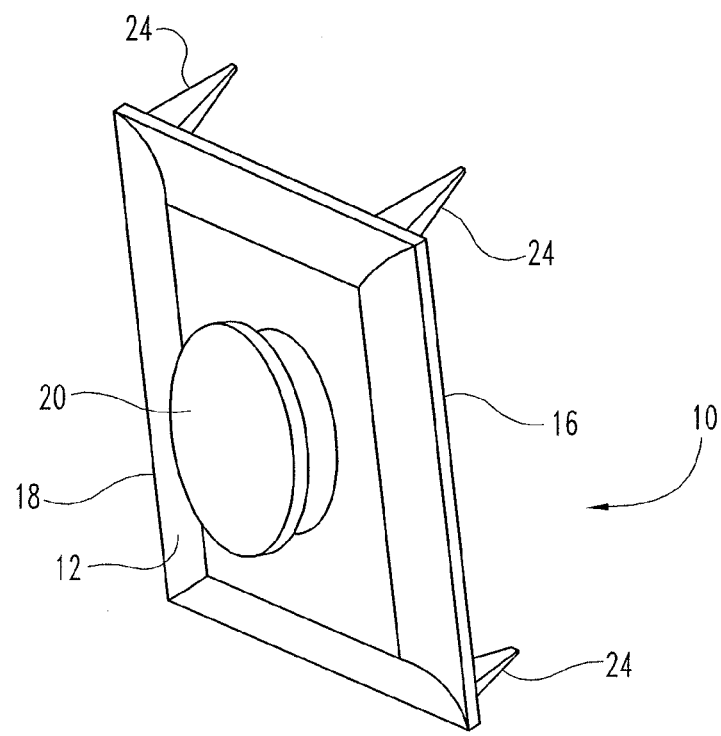
FIG. 2 is a perspective view of another embodiment paint shield.

Referring to FIG. 1, one embodiment of a paint shield 10 for protecting an electrical device such as an outlet or switch in a wall being painted or otherwise finished is shown. FIG. 2 shows another embodiment of paint shield 10 for protecting an electrical device such as an outlet or switch in a wall being painted or otherwise finished. Each embodiment of paint shield 10 includes an outer wall member 12 defining a front 14, an oppositely facing rear 16, and a perimeter 18. Paint shield 10 of FIG. 1 includes a pair of handles 20, 22 extending outwardly from front 14 that allow gripping of paint shield 10 for insertion into and removal from the electrical device. Other embodiments, such as shown in FIG. 2, contemplate a single handle. In still other embodiments more than two handles may be provided. Paint shield 10 also includes a plurality of mounting members 24 extending outwardly from rear 16 in a rearward direction away from front 14. Mounting members 24 are positionable into an outwardly facing opening of a junction box of the electrical device when the cover plate of the electrical device is removed. Mounting members 24 are positioned on or by at least two, and, in the illustrated embodiments, four of the corners of wall member 12. As discussed further below, mounting members 24 are press fit into the corners of the junction box to contact the inner wall surfaces of the junction box the define the corners and securely hold paint shield 10 in position thereon.

Figure 3:
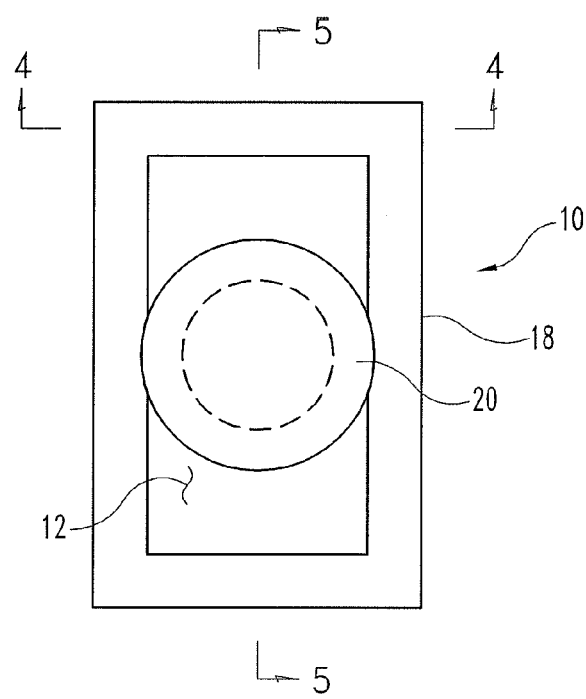
FIG. 3 is a front elevation view of the paint shield of FIG. 2.
Figure 4:
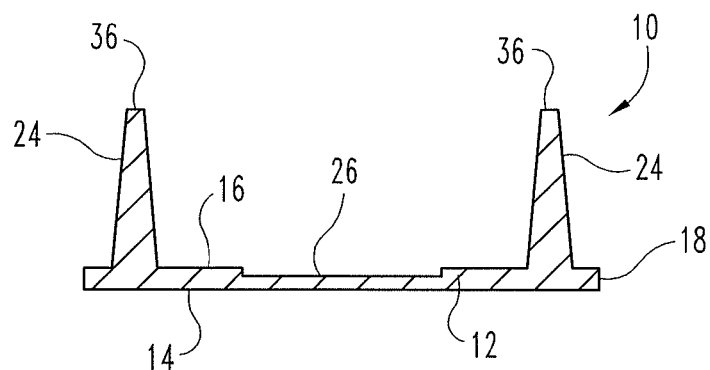
FIG. 4 is a section view along line 4-4 of FIG. 3.
Figure 5:
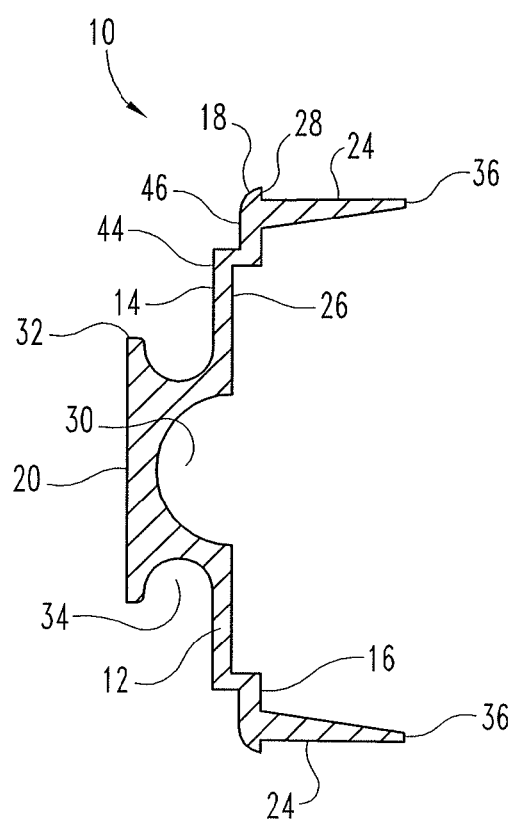
FIG. 5 is a section view along line 5-5 of FIG. 3.
Figure 7:
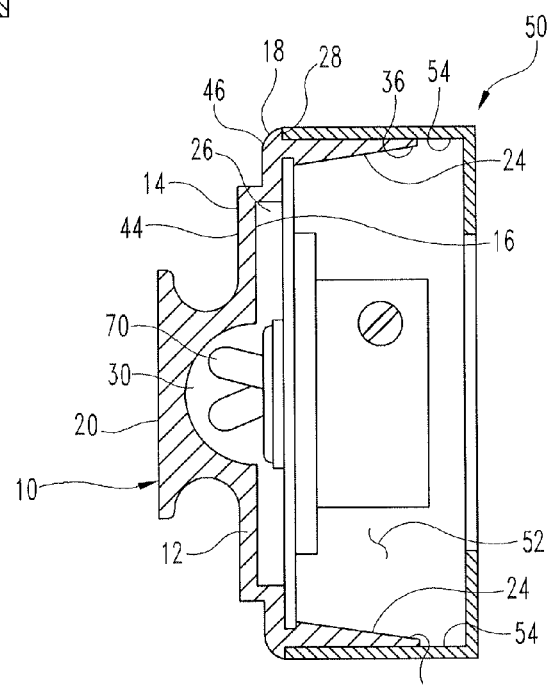
FIG. 7 is a section view of paint shield of FIG. 2 attached to a switch type electrical device.

Referring further to FIGS. 3-5, paint shield 10 of FIG. 2 is shown in further detail, it being understood that the features of the FIG. 2 paint shield also apply to the paint shield embodiment of FIG. 1. Paint shield 10 includes a recessed central portion 26 in rear 16 that faces the junction box. Recessed portion 26 is offset from a rearward facing outer lip 28 by a step 27. Rear 16 defines a planar profile that forms outer lip 28 with a planar profile. Lip 28 is connected to and extends inwardly from perimeter 18 toward the center of wall member 12. Recessed portion 26 accommodates the portion of the outlet or switch that typically protrudes from the junction box while allowing lip 28 at rear 16 of paint shield 10 to be placed in contact with or as close as possible to the wall surface around the junction box. In one embodiment, lip 28 is positioned against the wall surface to prevent drips or runs from the wall surface from reaching the junction box. Furthermore, handle 20 defines a hollow interior 30 to receive, for example, a lever from a switch type electrical device, such as shown in FIG. 7. Handle 20 includes an outer flange 32 located at the outer end of handle 20, and a groove 34 between handle 20 and front 14 that extends around handle 20 to provide a gripping location for easy installation and removal of paint shield 10 from the junction box.

Wall member 12 includes a central raised front portion 44 that defines recessed portion 26 and an offset portion 46 extending around raised front portion 44 that defines the inward limits of lip 28. Handle 20 extends frontwardly from front portion 44 of wall member 12 to outer flange 32. Front portion 44 provides sufficient rigidity to maintain the structural integrity of wall member 12 while accommodating projecting parts of the switch or outlet. Furthermore, offset portion 46 extends from front portion 44 to perimeter 18 and maintains the thickness of wall member 12 while reducing the height of wall member 12 from rear 16 adjacent to the wall being painted or finished, facilitating painting around paint shield 10.

Figure 6:
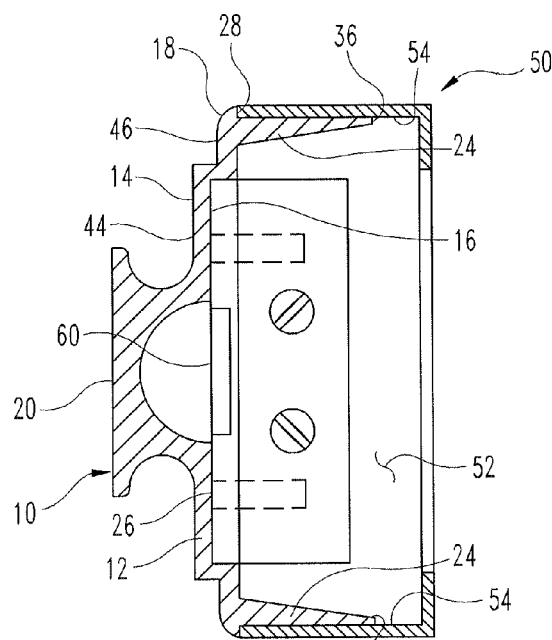
FIG. 6 is a section view of paint shield of FIG. 2 attached to an electrical outlet type electrical device.

As shown in FIGS. 6 and 7, junction box 50 includes an inner wall surface 52 defining corners 54 into which mounting members 24 are positioned to contact inner surface 52. In FIG. 6, an electric outlet 60 is shown mounted to junction box 50 with its cover plate removed. In FIG. 7, a switch 70 is shown mounted to junction box 50 with its cover plate removed. Mounting members 24 each include a tapered cross-section extending outwardly from a first end attached to wall member 12 at lip 28 along rear 16. Mounting members 24 extend from the first end to an opposite second end that forms outer end 36. The tapering outer cross-section allows independent deflection of mounting members 24 in any direction transverse to their length so that they are more readily deflected at least adjacent their outer ends 36 for insertion into the corners 54 of the junction box 50. The greater cross-sectional size of mounting members 24 adjacent rear 16 provides more limited deflection of mounting members 24 as they are pushed into junction box 50, providing a secure frictional engagement of each mounting member 24 with inner surface 52 at its respective corner 54 and maintaining paint shield 10 in position on junction box 50. Rear facing lip 28 is positioned at or against the wall surface around junction box 50 when paint shield 10 is fully seated on junction box 50 to prevent paint or other material from entering between rear 16 and junction box 50.

In the illustrated embodiment, mounting members 24 each include a tapering, triangular cross-sectional shape oriented to provide an intimate fit in the junction box and to minimize the width of protrusion of the mounting member 24 into the junction box. The portion of perimeter 18 and rear 16 between mounting members 24 defines a planar surface between and connecting adjacent mounting members 24 wherein the planar surface lacks protrusions, walls, tabs or other structures extending from lip 28 that might interfere with or hinder placement of paint shield 10 into the junction box. Accordingly, by engaging junction box 50 only at its corners, paint shield 10 provides a minimum amount of interference fit of mounting members 24 with the junction box 50 that is sufficient to securely mount paint shield 10 to the junction box 50 while avoiding walls and other structures depending from rear 16 that interfere with placement of rear 16 against the wall surface. Mounting members 24 are flexibly connected to wall member 12 so that mounting members 24 can deflect if necessary when inserted into the junction box. Mounting members 24 are also elastic so that they are normally biased to return toward their pre-insertion, normal orientation relative to wall member 12 and frictionally engage the inner surface 52 of junction box 50, and to return to their normal orientation when removed from junction box 50.

It is contemplated that paint shield 10 is made from a plastic type material and in a one-piece construction for durability and resiliency. Furthermore, paint shield 10 can be washable to remove paint therefrom and facilitate re-use of paint shield 10 for subsequent projects. However, paint shield 10 can be made from multiple components assembled or fused together, and from materials other than plastic.

According to one aspect, there is provided a paint shield with a wall member defining a front and an oppositely facing rear, and a plurality of mounting members extending outwardly from the rear from at least two corners of the wall member. In one refinement, the wall member includes four corners and a mounting member extending from each of the four corners.

In one embodiment, the wall member defines a perimeter and the mounting members are offset inwardly from the perimeter to define a rearwardly facing planar lip that extends completely around and between the mounting members.

In another embodiment, the mounting members include a cross-section that tapers in a direction away from the rear to provide variable resistance to deflection of the mounting members along their lengths, facilitating initial insertion of the mounting members into a junction box and subsequent engagement against inner surfaces of the junction box.

In a further embodiment, the perimeter of the wall member lacks any protrusions extending from the rear thereof except for the mounting members located at the corners of the wall member, allowing the rear lip around the perimeter of the wall member to be positioned flush against the wall without interference from wires and other components in the junction box and/or irregular wall cuts around the junction box opening.

In another embodiment, the wall member includes at least one handle protruding outwardly from the front that defines a hollow interior to receive a lever of a switch type electrical device.

According to another aspect, a paint shield and junction box for an electrical device are provided, wherein the paint shield is mounted in an outwardly facing opening of the junction box so that a wall member of the paint shield covers the opening and so that mounting members extending from corners of the wall member are press fit into corners of the junction box against an inner wall surface of the junction box.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A paint shield for a junction box, comprising:
a wall member defining a front, an oppositely facing rear, and an outer perimeter extending between a plurality of corners of the wall member, said rear of said wall member further defining a lip that extends in a plane inwardly from said perimeter; and
a plurality of mounting members projecting rearwardly from said rear of said wall member, each of said mounting members being located adjacent a respective one of said plurality of corners of said wall member, each of said mounting members including an elongated body flexibly attached to said rear of said wall member at a first end of said mounting member, and each of said mounting members further extending from said first end to an opposite second end of said mounting member, wherein said lip defines a planar surface that extends between and connects adjacent ones of said mounting members and said perimeter of said wall member, wherein each of said plurality of mounting members are configured to be positioned in engagement with a respective inner corner of the junction box.

2. The paint shield of claim 1, wherein said lip extends completely around said mounting members.

3. The paint shield of claim 1, wherein each of said mounting members includes a cross-section that tapers from said first end to said second end.

4. The paint shield of claim 1, wherein said wall member includes a central raised portion that is offset from said lip toward said front, said raised portion defining a rearwardly opening recess configured to receive an electrical structure mounted to the junction box when said mounting members are engaged in respective corners of the junction box.

5. The paint shield of claim 4, further comprising at least one handle connected to said wall member at said central raised portion, wherein said handle extends frontwardly from said wall member to an outer end of said handle.

6. The paint shield of claim 5, wherein said outer end of said handle includes a flange and a groove between said flange and said central raised portion to provide a gripping location for installation and removal of the paint shield.

7. The paint shield of claim 6, wherein said handle defines a hollow interior.

8. A paint shield for a junction box, comprising:
a wall member defining a front, an oppositely facing rear, and an outer perimeter extending between a plurality of corners of the wall member, said rear of said wall member further defining a lip that extends around said perimeter; and
a plurality of mounting members projecting rearwardly from said rear of said wall member, each of said mounting members being located adjacent a respective one of said plurality of corners of said wall member, each of said mounting members including an elongated body flexibly attached to said wall member at a first end of said mounting member, and each of said mounting members further extending from said first end to an opposite second end of said mounting member, wherein each of said mounting members includes a cross-section that tapers in a direction that extends from said first end toward said second end.

9. The paint shield of claim 8, wherein said rear of said wall member defines a plane and said lip extends in said plane inwardly from said perimeter, wherein said lip defines a planar surface that extends between and connects adjacent ones of said mounting members and said outer perimeter.

10. The paint shield of claim 8, wherein said lip extends completely around said mounting members and each of said plurality of mounting members are configured to be positioned in engagement with a respective inner corner of the junction box.

11. The paint shield of claim 8, wherein said wall member is free of structures projecting from said rear of said wall between said mounting members.

12. The paint shield of claim 8, wherein said cross-section is triangular.

13. The paint shield of claim 8, wherein said wall member is flexible.

14. The paint shield of claim 13, wherein said mounting members are elastic and flexibly connected to said wall member.

15. The paint shield of claim 8, wherein said wall member includes a central raised portion that is offset from said lip toward said front, said raised portion defining a rearwardly opening recess configured to receive an electrical structure mounted to the junction box when said mounting members are engaged in respective corners of the junction box.

16. A method, comprising:
removing a cover plate from a junction box of an electrical device mounted in a wall to be painted; and
attaching a paint shield to the junction box, the paint shield including a wall member defining a front, an oppositely facing rear, and an outer perimeter extending between a plurality of corners of the wall member, the rear of the wall member further defining a lip that extends in a plane inwardly from the perimeter, the paint shield including a plurality of mounting members projecting rearwardly from the rear of the wall member, each of the mounting members being located adjacent a respective one of the plurality of corners of the wall member, each of the mounting members including an elongated body flexibly attached to the rear of the wall member at a first end of the mounting member, and each of the mounting members further extending from the first end to an opposite second end of the mounting member, wherein the lip defines a planar surface that extends between and connects adjacent ones of the mounting members and the perimeter of said wall member, wherein attaching the paint shield includes covering an opening of the junction box with the wall member of the paint shield while engaging inner corners of the junction box with respective ones of the plurality of mounting members projecting outwardly from the wall member.

17. The method of claim 16, wherein engaging inner corners of the junction box includes deflecting the mounting members inwardly toward one another to frictionally engage an inner surface of the junction box that defines the corners.

18. The method of claim 17, wherein each of the mounting members tapers in cross-section in a direction extending from the wall member to the second end of the respective mounting member.

19. The method of claim 16, wherein attaching the paint shield includes positioning the lip of the wall member against a surface of the wall in which the junction box is mounted.

20. The method of claim 16, wherein the mounting members are the only structures projecting rearwardly from the wall member.

\* \* \* \* \*